United States Patent
Chapman et al.

(10) Patent No.: US 6,471,627 B2
(45) Date of Patent: *Oct. 29, 2002

(54) HEAT-SHRINKABLE UHMV POLYMER FILM, TUBING, AND ROLL COVERS

(75) Inventors: Frank M. Chapman, Elkton, MD (US); Randall F. Chapman, Elkton, MD (US)

(73) Assignee: Fluoron, Inc., Elkton, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/194,858
(22) PCT Filed: Jun. 9, 1997
(86) PCT No.: PCT/US97/10091
§ 371 (c)(1), (2), (4) Date: Dec. 3, 1998
(87) PCT Pub. No.: WO97/47460
PCT Pub. Date: Dec. 18, 1997

(65) Prior Publication Data
US 2002/0098961 A1 Jul. 25, 2002

Related U.S. Application Data
(60) Provisional application No. 60/019,438, filed on Jun. 10, 1996.
(51) Int. Cl.[7] ................................. B23P 15/00
(52) U.S. Cl. .............................. 492/56; 492/48; 29/447; 428/34.9; 428/35.1
(58) Field of Search ................. 492/56, 48; 264/209.1, 264/209.7, 299, 310; 29/447; 428/34.9, 35.1, 421, 422, 515, 910; 525/348.1, 242

(56) References Cited

U.S. PATENT DOCUMENTS

| | | | | |
|---|---|---|---|---|
| 3,050,786 A | * | 8/1962 | St. John et al. | |
| 3,225,129 A | * | 12/1965 | Taylor et al. | |
| 3,426,119 A | * | 2/1969 | Chapman et al. | |
| 3,481,805 A | * | 12/1969 | Holmes et al. | |
| 3,749,621 A | | 7/1973 | Schoffner | |
| 4,325,998 A | * | 4/1982 | Chapman | 428/36 |
| 4,585,215 A | * | 4/1986 | Kramer | 267/124 |
| 4,768,761 A | * | 9/1988 | Kramer | 267/154 |
| 5,030,487 A | * | 7/1991 | Rosenzweig | 174/DIG. 8 |
| 5,070,597 A | * | 12/1991 | Holt et al. | 138/103 |
| 5,142,759 A | * | 9/1992 | Bonander et al. | 492/48 |
| 5,290,498 A | * | 3/1994 | Shiraki et al. | 264/209.2 |
| 5,370,889 A | | 12/1994 | Fortuin et al. | 428/339 |
| 5,434,010 A | * | 7/1995 | Smith et al. | 428/34.9 |
| 5,683,767 A | * | 11/1997 | Shiraki et al. | 138/DIG. 7 |
| 6,210,765 B1 | * | 4/2001 | Tanaka et al. | 428/34.9 |
| 6,245,174 B1 | * | 6/2001 | Cordia et al. | 156/160 |

OTHER PUBLICATIONS

Patent Abstracts of Japan vol. 16, No. 477 (M–1320), Oct. 5, 1992, Japan (Abstract), Mitsui Petrochem, JP04173320A, Jun. 22, 1992, Corresponding Application.

* cited by examiner

Primary Examiner—I. Cuda-Rosenbaum
(74) Attorney, Agent, or Firm—Thomas P. Dowd

(57) ABSTRACT

The present relates to the heat shrinkable thermoplastic materials which are used as roll covers. The heat shrinkable materials used for the roll covers include only ultra high melt viscosity polymers, having a melt viscosity too high for conventional melt processing, such as TFM and UHMWPE, rather than the conventional FEP or PFA.

9 Claims, 2 Drawing Sheets

HEAT-SHRINKABLE UHMV POLYMER FILM, TUBING, AND ROLL COVERS

CLAIM OF PRIORITY BASED ON CO-PENDING PROVISIONAL APPLICATION

The present application is related to co-pending Provisional patent application U.S. Ser. No. 60/019,438 of Frank M. and Randall F. Chapman, filed Jun. 10, 1996, entitled "HEAT-SHRINKABLE UHMV POLYMER FILM, TUBING, AND ROLL COVERS", and based on which priority is herewith claimed under 35 U.S.C. 119(e), and any other applicable statute or Convention, and the disclosure of which is incorporated herein by reference in its entirety.

BACKGROUND OF THE INVENTION

1. Field of the Invention

The present invention relates generally to the production of heat-shrinkable thermoplastic material and to the fabrication of films, sheets, and tubing of such material, as well as roll covers used on machinery rollers, such as paper machine rolls, textile rolls, food processing rolls, and lamination equipment.

2. Prior Art

Heat-shrinkable thermoplastics are used in many applications, among which are covering for machinery rollers in mill installations, such as in paper mills, where the rolls are used for guiding, spreading, and carrying the material being processed. These rolls are commonly provided with a polymer cover on their surface to resist corrosion and minimize friction and sticking. Various processes and materials for making and applying such tubes and roll covers are disclosed in, U.S. Pat. Nos. 3,050,786 to A. N. St. John et al, U.S. Pat. No. 3,225,129 to J. S. Taylor et al, U.S. Pat. No. 3,426,119 to F. M. Chapman et al, U.S. Pat. No. 3,481,805 to R. L. Holmes et al, U.S. Pat. No. 3,749,621 to J. P. Shoffner, U.S. Pat. No. 4,325,998 to H. S. Chapman, and U.S. Pat. No. 5,142,759 to J. Bonander et al.

A typical polymer cover of this type is in the form of Heat-Shrinkable Tubing (HST) commonly made from fluorinated ethylenepropylene copolymer (FEP), and less often from perfluoroalkoxy (PFA), a copolymer of tetrafluoroethylene (TFE) and perfluoropropyl vinyl ether (PPVE). The HST is presently fabricated by taking a suitable tube, welded from FEP sheet or fabricated by some other method, and applying pressure and heat to expand it hot, followed by cooling it in its expanded state to freeze the stress put into it by the expanding. The cooled tube is then shrunk onto the surface of the roll, again using the application of heat, to tightly shrink the tube or sleeve about the surface. The heating temperatures used with FEP HST are typically in the range of 170° F. to 300° F., well below its melt temperature of about 500° F.

The melt processable FEP and PFA that are typically used in the HST application have been chosen over polytetrafluorethylene (PTFE), or other ultra high melt viscosity (UHMV) fluoropolymers, such as chemically modifiedPTFE, available as "Hostaflon" from Hoechst AG of Burgkirchen, Germany, and commonly referred to as TFM, even though the latter materials have lower cost, greater strength, hardness, flex life, and other preferred physical properties and higher temperature use and service limits. This choice has been primarily due to the understanding and expectation in the art that the latter materials require higher temperatures to shrink. UHMV polymers are polymers that have a melt viscosity, which is too high for conventional thermoplastic processing, being of the order of a million times higher than conventional polymers that are suitable for melt processing. For example, PTFE has a melt viscosity of 101 l poises while FEP has a melt viscosity of $10^4$ to $10^5$ poises. Another UHMV polymer that has not been used in the HST application is ultra high molecular weight polyethylene or UHMWPE, which is an extremely high density polyethylene with a molecular weight range of 3,000,000 to 6,000,000. This compares with a molecular weight range of 300,000 to 500,000 for high molecular weight polyethylene (HMWPE), which can be readily melt processed. Again, the melt viscosity of UHMWPE is too high for conventional melt processing. Thus, while PTFE and other UHMV polymers have many superior qualities and, in addition, may be much less costly, still heretofore, FEP has been regarded as the preferred material in implementing this shrink technique.

Expanded UHMV polymer tubes such as those made from PTFE are known, but they have not been satisfactorily employed in the HST shrink process since state of the art HST made from PTFE is typically heated to near or above the gel temperature of PTFE, 621° F., first for expansion and again, after cooling, to effect complete recovery, i.e., shrinkage of the tube onto the roll. These temperatures are so high as to pose a danger of causing thermal damage to the substrate roll and as a practical matter they cannot be easily accomplished on larger samples with the application of energy from a simple tool, such as a hot air gun currently used with FEP HST. Moreover, during heating of the HST to the gel temperature for recovery there is a tendency for one section of the tube to be overheated while the remainder of the tube is too cool to shrink on the roll. This leads to the problem of non-uniform recovery/shrinkage of the tube. Although in the above-noted U.S. Pat. No. 3,050,786 it is taught that PTFE recovery can be accomplished at lower temperatures, as low as 300° F., this is at the expense of process time, particularly when rapid cooling is used.

Problem to be Solved:

Developing a system and method for producing heat-shrinkable film, sheets, and tubing with optimal properties and ease of processing and installation for facilitating use such as in making HST and in other suitable applications.

Objects:

It is accordingly an object of the present invention to utilize the discovery that a conventional material, having heretofore unappreciated capabilities, can be fabricated with a comparatively simple process to achieve improved heat-shrinkable film, tubing, and roll covers.

It is another object of the present invention to reveal the superiority of PTFE, and other UHMV polymeric materials such as TFM, and UHMW polyethylene, over FEP and irradiated HMWPE in the heat-shrinkable tubing (HST) process for covering machine rolls and other components.

It is a further object of the invention to provide improved heat-shrinkable tubes of TFE, TFM, and UHMWPE materials, reinforced with conductive and other additives, as covers for rolls, bars, tubes, pipes, and other elements of a relatively constant circumference, as well as improved heat-shrinkable sheets and film of these materials, particularly heretofore unrealized UHMWPE heat-shrinkable film.

SUMMARY OF THE INVENTION

The present invention involves the discovery of the suitability and advantages to be achieved with the use of PTFE and other ultra high melt viscosity (UHMV) polymers such as TFM, and UHMWPE, as heat shrinkable material, and their use, rather than FEP or PFA, in the HST process. It has been found, for instance, that PTFE, typically fully sintered PTFE used in HST applications, may be readily substituted for FEP in the typical HST process with little significant change in the existing process steps. Appropriate expansion of a PTFE tube may be obtained with pressure and heat treatment at temperatures less than 300° F., preferably in the range from about 190° F. to about 250° F., in a matter of a few minutes, and the resulting tube is sufficiently stable to be shipped for later shrink application at comparable temperatures onto a roll at a mill. Also, UHMV polymers may be processed in the form of a sheet or a film to produce improved heat-shrinkable material that is shrinkable at comparatively low temperatures in a minimum time, particularly heretofore unrealized UHMWPE heat-shrinkable film. The tube and the sheet or film are shrinkable in at least one dimension and may be shrinkable in two dimensions.

A typical HST process begins with the provision of a tube which may involve, first, cutting a sheet of ultra high melt viscosity (UHMV) polymer film, e.g., of PTFE, TFM, or UHMWPE, to the appropriate circumference and length to fit the roll to be covered, as is done with FEP. The edges of the cut sheet are then joined, such as by fusion welding, to form a tube with a seam that is strong enough to be expanded. This tube is then expanded to a sufficient size to fit about the surface of the roll, by closing its ends and placing it in an expansion housing or sizing chamber, such as a cylindrical pipe that will accept the UHMV tube and determine the diameter to which it will expand. The tube is expanded to that diameter using pressure and, if desired, heat, such as steam heat at a temperature of about 200° F., or, depending on the material thickness, to a temperature somewhere above the expansion temperature but below the gel temperature. The expanded tube is cooled to ambient temperature at the expanded diameter and is sufficiently stable upon cooling to be stored for later shipment and use. After shipment, the tube is slipped over the roll surface to be covered and, when positioned properly, the tube material is heated, e.g., using hot air guns, a gas torch, a heat blanket, or an oven, to a temperature sufficient to shrink it into tight contact with the surface, e.g., a temperature somewhat higher than the temperature at which it was expanded, typically at about 225° F. The shrink time is typically less than 3 minutes. The size of the circumference of the tube is chosen initially to be about 0.50 to about 0.95 times, and preferably from about 0.80 to about 0.92 times, the roll size. The resulting roll cover has improved mechanical properties as well as being amenable to being reinforced with suitable particulate additives such as a conductive additive to provide anti-static properties and additives to improve its wear, load carrying, and compressive strength, and to reduce its thermal expansion, as are variously known in the art.

DETAILED DESCRIPTION OF THE PREFERRED EMBODIMENTS

Figure 1:
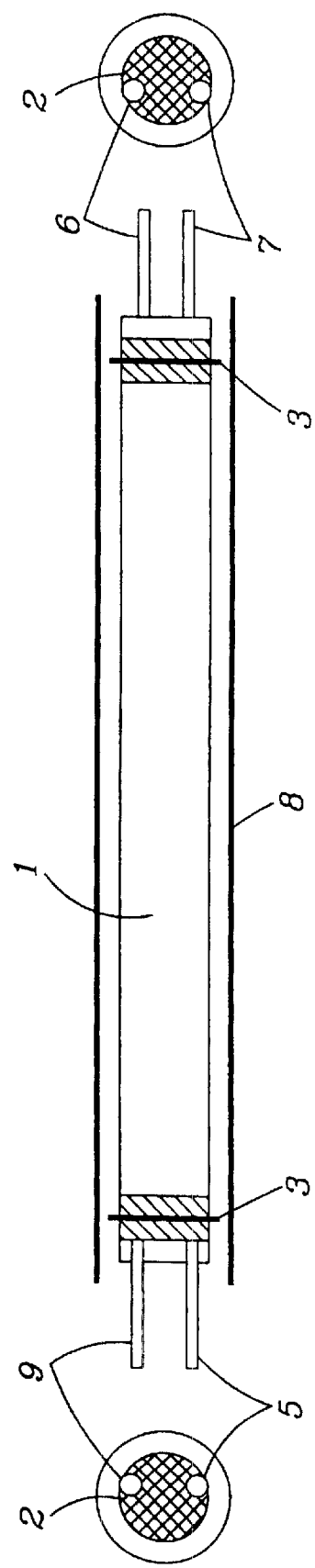
FIG. 1 is an illustrative diagram of an apparatus for expanding an UHMV polymer tube in accordance with the invention.

The present invention is based on the discovery that PTFE and other UHMV polymer materials, such as TFM, and UHMW polyethylene, can be utilized advantageously as heat-shrinkable material with heretofore unappreciated ease and rapid, low temperature processing. A particular application is to use such UHMV polymer material, rather than FEP or PFA, in the conventional HST process, with minor modifications, to achieve a Heat-Shrinkable Tubing (HST) or roll cover of improved qualities and economy. The UHMV polymers have been found to be suitably shrinkable, after expansion, using a simple heating device, such as a hot air gun, for a few minutes at a comparable temperature to that of the FEP, e.g., significantly less than 300° F., rather than the 600–700° F. presently thought to be necessary by the art. Additionally, this capability may be exploited in producing improved heat-shrinkable sheets and films of these materials.

In producing HST for roll covers, it has been discovered that tubes of PTFE and other UHMV polymers can be expanded under pressure, with or without heat, but preferably after mild heating, and then shrunk about the surface of the roll again using mild heat to release the stresses therein. The tube is preferably heated before being expanded to build in adequate stresses to maintain the expansion upon cooling and which later are released by heat for shrinking the tube about the roll. Contrary to the prevailing belief in the art, the PTFE polymer tube need not be heated to temperatures near the melting point when expanded in order to achieve satisfactory stability upon cooling, and need not then be released at a comparable temperature to shrink about the roll. Rather, it has been found that heating the tube at temperatures comparable to FEP processing, i.e., in the range from about 150° F to about 300° F., and preferably from about 190° F. to about 225° F., before expanding the tube, will provide sufficient stresses in the material to give satisfactory stability upon cooling. The sufficiently stable expanded tube may be shrunk, immediately or later, about a roll surface by releasing the stresses with the application of heat at comparable temperatures, preferably somewhat higher than the expansion temperature, e.g., about 225° F.–250° F. for a few minutes, typically less than 3 minutes.

It has also been determined that instead of processing the UHMV polymer material in tubular form, it may be appropriately heated, expanded, and cooled as a sheet or film, so that, for example, heretofore unknown heat-shrinkable UHMWPE film may be produced that is shrinkable at easily workable temperatures. Further, unlike HMWPE, which is irradiated to produce cross-linking to manufacture HST, the UHWPE may be processed and heat shrunk without radiation. It also may be shrinkable in two dimensions.

An exemplary method for producing and applying an improved heat-shrinkable covering material, such as for roll covers, or wire jacketing, or the like, in accordance with the invention is carried out generally as follows.

The cover is initially prepared by:

1. First, a sheet of ultra high melt viscosity (UHMV) polymer film, e.g., of fully sintered PTFE, TFM, or UHMW polyethylene, is cut to the appropriate circumference (somewhat smaller) and length (somewhat longer) to fit the roll to be covered. Alternatively, paste extruded and sintered tubing or ram extruded tubing may be used rather than the film, in which event the next step is not required. Also, tape wrapping and subsequent fusing is another commercial process for forming suitable tubing such as disclosed in the above-noted U.S. Pat. No. 3,225,129 to Taylor et al.

2. The lengthwise edges of the cut sheet are then joined by fusion welding to form a tube with a seam that is strong enough to be expanded.

3. The fabricated tube, preparatory to being expanded to a sufficient size to fit about the surface of the roll, is typically placed in a pipe or similar expansion housing or chamber having a volumetric shape or diameter that will determine the size or diameter to which the tube will expand.

4. Both ends of the tube are then closed, for example, by inserting end plugs or plates therein, with holes for admitting and draining fluids, and the ends are sealed with clamps that surround the ends and plates.

5. A differential pressure is applied so that the internal pressure in the tube causes the. tube to expand, preferably after the tube has been heated to an elevated temperature of anywhere from about 150° F. to about 300° F., preferably about 190° F. to about 225° F.

6. The differential pressure is increased until the UHMV polymer tube expands to fill the pipe or sizing chamber.

7. The expanded and heated tube is then cooled down to ambient temperature so as to freeze it at the expanded size. While the tube can be expanded without the application of heat, its stability and internal stresses may be found unsatisfactory under such circumstances if the tube is not immediately placed on the roll or wire bundle. By heating to the indicated temperatures before expansion, sufficient stability will be produced to permit storage of the tube and later satisfactory release of the stresses and heat shrinking about the roll surface with the use of heat at similar temperatures.

8. The pressure is held at a sufficient level during cool down to prevent the tube from shrinking from the expanded size.

9. Cool down can be accelerated by spraying water on the expansion pipe or sizing chamber or allowing slow cooling of the sleeve by air to achieve a sufficiently stable state at ambient temperature.

10. The assembly is then dismantled and the expanded tube removed. The unexpanded end portions beyond the clamps may be cut off. The expanded tube is now ready for application to a roll immediately, or it may be stored in this sufficiently stable condition until selected for use. It may be shipped in this condition to the point of application, e.g., a paper mill, and shrunk onto a roll at the mill. It is believed that the sufficiently stable condition can be assured by and results from the cooling in of the stress created within the material by the pressurizing at an elevated temperature.

When the expanded tube is ready for application, then:

11. The expanded UHMV polymer tube is slipped over the surface of the object to be covered, e.g., a machinery roller, or a wire bundle, in the event it is to be used for jacketing on the bundle, or a coupling on a pipe to be joined.

12. When positioned properly over the surface to be covered, the expanded tube material is then heated again, e.g., using hot air guns, a gas torch, an oven, or a heating blanket, to a temperature in general somewhat above the expansion temperature and definitely below its gel temperature and particularly, e.g., 225° F.–250° F., to shrink it into tight contact with the surface. The heat shrinking temperature is preferably somewhat higher than the expansion temperature and shrinking should normally take less than 3 minutes. Upon cooling of the material, the roll has been provided with an improved cover.

In addition to the foregoing exemplary general method of fabricating and installing heat shrinkable covering material, a particular example of a means and specific parameters for preparing and expanding the tube in a roll cover fabricating method in accordance with the invention involves the following.

1. When a UHMV tube of fully sintered PTFE, for example, is initially being fabricated, the size of the circumference of the tube is chosen to be about 0.50 to about 0.95, preferably about 0.80 to 0.92, times the roll size upon heating. The material may be reinforced with suitable additives and particulates, such as carbon and other known electrically conductive additives to impart anti-static properties and/or other additives to enhance its load carrying and compressive strength and wear resistance.

2. As shown in FIG. 1, the tube 1, after fabrication, has one end closed, for example the right end, by inserting therein an end plug or plate 2, having holes for respectively accommodating a conduit 6 for admitting compressed air and a conduit 7 for admitting steam. Conveniently, the end plate 2 is of aluminum, with a ½" top hole, for admitting the compressed air, and a ½" bottom hole, for admitting steam, aligned on the bottom.

3. High torque hose clamps 3 are placed over the PTPE tube material 1 around the end plate 2 and torqued to about 160 inch-lbs. to seal the tube end. The maximum torque for the hose clamps is about 170–180 inch-lbs.

4. The other end of the tube 1 is also closed with an end plug or plate 2, conveniently of aluminum and having ½" top hole, for checking the pressure in and venting the tube interior, and a ½" bottom hole, for accommodating a fluid drain 5 pipe, aligned on the bottom.

5. High torque hose clamps 3 are similarly placed over the PTFE tube material around the latter end plate and torqued to 160 inch-lbs.

6. A quick disconnect for the steam conduit 7 is attached to the bottom ½" hole in the right end plate 2, and a ⅜" compressed air line 6 with a ball valve is inserted into the top hole.

7. On the other end plate 2, a ½₁"×6' long drain pipe 5 with ball valve is inserted into the bottom hole and a quick disconnect with a valve on the same line 9 is attached to the upper hole running to a 30 psi pressure gauge at a control panel.

8. The UHMV tube or sleeve 1 is then inflated with air, making sure that the drain line 5 is on the bottom and that the tube 1 is placed at an angle that will let water drain out through the drain valve in pipe 5.

9. Steam is admitted into the tube 1 through conduit 7 with the drain and pressure release valves, in the lines 5 and 9 connected to left end plate 2, open.

10. The temperature is brought up to about 200° F.–205° F. while maintaining the pressure at a sufficient level to maintain the tube inflated, e.g., about 2.5 psi.

11. The pressure is then increased until the heated tube 1 expands to fill the sizing chamber or expansion pipe 8.

12. The pressure is held at the increased level to prevent the tube 1 from shrinking from the expanded size and the tube is then cooled in the expanded state. The expanded UHMV polymer or PTFE material, so processed, has been found to be sufficiently stable upon the completion of cooling. It is believed that this stability is the result of cooling in the stress created within the material by the heating and pressurizing.

13. Cool down may be accomplished by spraying water on the expansion housing or sizing chamber 8, or by allowing slow cooling of the tube 1 by air.

14. The chamber 8 and tube end sealing assemblies and conduits are then dismantled and the expanded PTFE tube removed in condition for application to a roll. It can be used immediately or it can be stored in this stable condition until ready for application to a roll, whereupon it may be shipped to the point of use, e.g., a paper mill.

Figure 2:
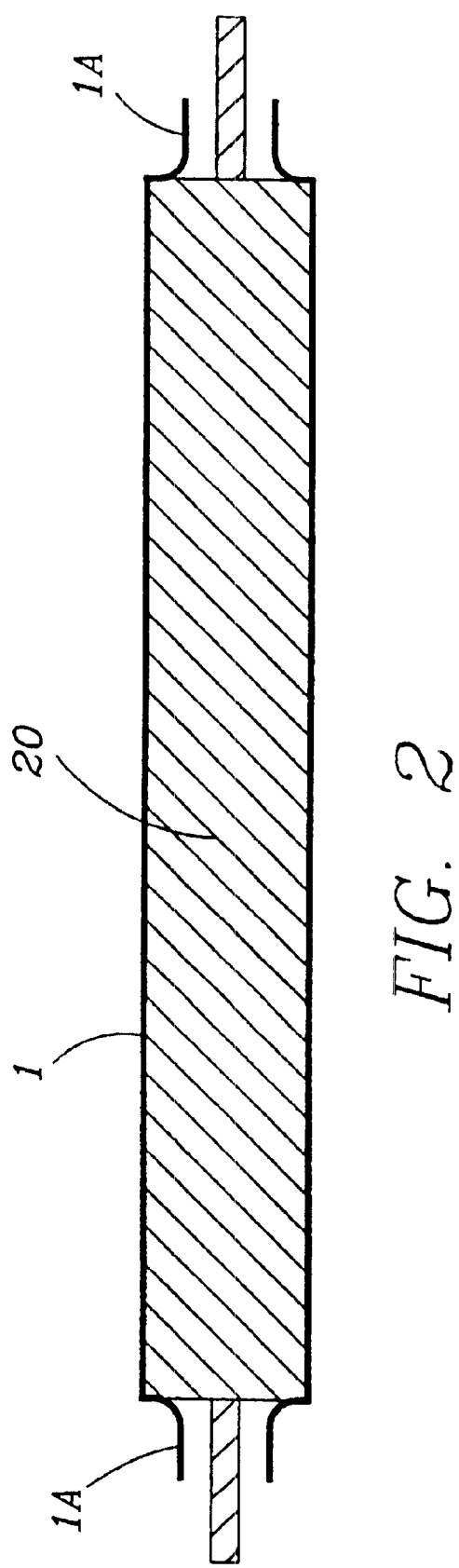
FIG. 2 illustrates a roll covered with an antistatic roll cover formed by a UHMV polymer tube that has been expanded by the apparatus of FIG. 1, cooled to room temperature, and then heat shrunk about the roll.

15. When ready, as shown in FIG. 2, the tube 1 may then be shrunk onto a roll 20 by slipping it over the roll surface and heating again, e.g., using hot air or a heating blanket or such, to a temperature comparable to that at which it was expanded, e.g., in the range from about 190° F. to about 225° F., and typically somewhat higher than the expansion temperature at about 225° F., for a few minites to shrink it into tight contact with the roll surface.

16. As seen in FIG. 2, the installed roll cover may have end portions 1a extending beyond the ends of the roll 20, that have been completely shrunk down. These end portions are then cut off to complete the installation.

It will accordingly be seen that an improved roll cover may be achieved using PTFE, and other UHMV polymeric materials such as TFM, and UHMWPE, in place of FEP, in the conventional HST process, with minor modifications. These UHMV polymers produce a roll cover of improved qualities and economy, which may also be enhanced or reinforced with a conductive additive to impart anti-static properties and/or other additives to enhance the load carrying and compressive strength and wear resistance. Further, the UHMV polymers may be processed so as to produce improved heat-shrinkable films, such as of UHMWPE, that are shrinkable at comparatively low temperatures.

What is claimed is:

1. An article of manufacture comprising an ultra-high melt viscosity polymer having a melt viscosity too high for conventional melt processing and pressure-expanded to a shape in a stressed condition, which stressed condition releases causing shrinking of said shape in at least one dimension under heating at a temperature below 300 F., and wherein said ultra-high melt viscosity polymer comprises a material selected from the group consisting of fully sintered polytetraflurorethylene, modified polytetraflurorethylene, and ultra-high molecular weight polyethylene.

2. The article of claim 1 wherein said shape in a stressed condition results from said polymer being heated and expanded linder pressure from an unexpanded shape to a pressure-expanded shape, and brought to ambient temperature under pressure while maintaining the pressure-expanded shape.

3. The article of claim 2 wherein said pressure-expanded shape shrinks under heating at a temperature above 250 F. and below 300 F. to approximately said unexpanded shape.

4. The article of claim 1 wherein said shape in a stressed condition is a tube.

5. The article of claim 4 further comprising a roll and wherein said tube is shrunk about and covers said roll.

6. The article of claim 5 wherein said roll covered by said tube is formed as a machinery roller.

7. The article of claim 1 wherein said shape in a stressed condition is a sheet or film.

8. The article of claim 1 wherein said article is a film of ultra-high molecular weight viscosity polyethylene.

9. The article of claim 1 containing an additive and wherein said additive comprises a material selected from the group consisting of carbon, material providing electrical conductivity, material providing improved abrasion resistance, material providing improved wear resistance, material providing improved load carrying, material providing improved compressive strength, and material providing reduced thermal expansion to said shaped article, and combinations thereof.

* * * * *